(12) United States Patent
da Silva Netto et al.

(10) Patent No.: US 7,871,130 B2
(45) Date of Patent: Jan. 18, 2011

(54) BIARTICULATED HEADREST FOR CHAIR

(75) Inventors: Jose Fernandes da Silva Netto, Santa Catarina (BR); Nilton Albano Junge, Santa Catarina (BR)

(73) Assignee: Dental Equipment, LLC, Charlotte, NC (US)

( * ) Notice: Subject to any disclaimer, the term of this patent is extended or adjusted under 35 U.S.C. 154(b) by 0 days.

(21) Appl. No.: 12/369,666

(22) Filed: Feb. 11, 2009

(65) Prior Publication Data

US 2010/0201176 A1 Aug. 12, 2010

(51) Int. Cl.
*A47C 7/38* (2006.01)
*A61G 15/12* (2006.01)

(52) U.S. Cl. .................. 297/408; 297/391; 297/404; 297/409; 297/410

(58) Field of Classification Search .................. 297/408
See application file for complete search history.

(56) References Cited

U.S. PATENT DOCUMENTS

| | | | | |
|---|---|---|---|---|
| 1,728,025 A | * | 9/1929 | Weber | 297/391 |
| 1,817,755 A | * | 8/1931 | May | 297/409 |
| 2,348,961 A | * | 5/1944 | Cowper | 297/409 |
| 2,463,410 A | * | 3/1949 | Morris | 297/408 X |
| 2,466,553 A | * | 4/1949 | McDonald, Jr. | 297/404 |
| 2,586,417 A | * | 2/1952 | Cole | 297/409 |
| 2,666,476 A | * | 1/1954 | Lycan | 297/404 |
| 2,672,917 A | * | 3/1954 | Collura | 297/408 X |
| 2,740,467 A | * | 4/1956 | Page | 297/409 |
| 3,041,034 A | * | 6/1962 | Wilkinson | 248/284.1 |
| 3,065,029 A | * | 11/1962 | Spound et al. | 297/391 |
| 3,477,761 A | * | 11/1969 | Krantz | 297/409 |
| 3,572,835 A | * | 3/1971 | Kees et al. | 297/410 |
| 3,692,356 A | * | 9/1972 | Mertens | 297/408 |
| 3,761,128 A | * | 9/1973 | Schenk et al. | 297/408 |
| 3,877,751 A | * | 4/1975 | Rasmussen | 297/408 X |
| 3,885,831 A | * | 5/1975 | Rasmussen | 297/410 |
| 4,062,587 A | * | 12/1977 | Wolters | 297/302.3 |
| 4,159,093 A | * | 6/1979 | Hamilton | 248/284.1 |

(Continued)

FOREIGN PATENT DOCUMENTS

KR 20-0376407 3/2005

(Continued)

OTHER PUBLICATIONS

International Search Report for PCT/US2009/033830, dated Sep. 29, 2009, three (3) pages.

(Continued)

*Primary Examiner*—Rodney B White
(74) *Attorney, Agent, or Firm*—TraskBritt

(57) ABSTRACT

A biarticulating headrest having a chair mount adapted for attachment at one end thereof to a back support section of a chair. The headrest includes a base plate on the backside thereof. One or more headrest mounts can be attached to the base plate at a first end thereof. A first axis can be attached to a second end of one or more of the headrest mounts and a second axis can be attached to a second end of the one or more chair mounts. The headrest includes a biarticulating headrest locking mechanism, wherein the positioning assembly is movably engaged to the first axis at a first end and to the second axis at the second end thereof.

21 Claims, 3 Drawing Sheets

U.S. PATENT DOCUMENTS

| | | | | |
|---|---|---|---|---|
| 4,335,920 | A * | 6/1982 | Hirth | 297/408 |
| 4,366,985 | A * | 1/1983 | Leffler | 297/409 |
| 4,375,902 | A * | 3/1983 | Tai et al. | 297/408 |
| 4,840,429 | A * | 6/1989 | Stockl | 297/409 |
| 5,177,823 | A * | 1/1993 | Riach | 297/408 X |
| 5,233,713 | A * | 8/1993 | Murphy et al. | 5/636 |
| 5,276,927 | A * | 1/1994 | Day | 5/622 |
| 5,427,436 | A * | 6/1995 | Lloyd | 297/408 |
| 5,669,668 | A * | 9/1997 | Leuchtmann | 297/408 |
| 5,971,485 | A * | 10/1999 | Clark | 297/408 X |
| 6,397,414 | B1 * | 6/2002 | Lloyd | 5/622 |
| 6,520,585 | B1 * | 2/2003 | Georg et al. | 297/408 |
| 6,718,582 | B1 * | 4/2004 | Tinsley | 5/640 |
| 6,726,280 | B1 * | 4/2004 | Liao | 297/353 |
| 6,739,006 | B2 * | 5/2004 | Borders et al. | 5/622 |
| 6,857,704 | B2 * | 2/2005 | Stenzel et al. | 297/408 |
| 6,893,096 | B2 * | 5/2005 | Bonn et al. | 297/408 X |
| 7,032,975 | B2 * | 4/2006 | Hummler et al. | 297/409 |
| 7,080,420 | B2 * | 7/2006 | Damron | 5/640 |
| 7,093,313 | B2 * | 8/2006 | DeBraal et al. | 297/408 X |
| 7,240,966 | B2 | 7/2007 | Stone et al. | |
| 7,350,250 | B2 * | 4/2008 | Froelich | 5/637 |
| 7,424,759 | B2 * | 9/2008 | Damron | 5/641 |
| 7,549,704 | B1 * | 6/2009 | Chou et al. | 297/408 |
| 7,610,639 | B2 * | 11/2009 | Roleder et al. | 5/622 |
| 2008/0191536 | A1 * | 8/2008 | Hyvarinen | 297/408 |
| 2008/0258532 | A1 * | 10/2008 | Cassaday | 297/408 |
| 2009/0200851 | A1 * | 8/2009 | Link | 297/408 X |

FOREIGN PATENT DOCUMENTS

| | | |
|---|---|---|
| KR | 20-0377447 | 3/2005 |
| KR | 20-0417793 | 6/2006 |
| KR | 20-0426287 | 9/2006 |

OTHER PUBLICATIONS

Written Opinion of the International Searching Authority for PCT/US2009/033830, dated Sep. 29, 2009, three (3) pages.

* cited by examiner

BIARTICULATED HEADREST FOR CHAIR

TECHNICAL FIELD

The present invention generally relates to a biarticulating headrest for use with patient chairs, such as dental chairs.

BACKGROUND

Various headrests for medical or dental chairs that allow positioning of a headrest relative to a patient's head are known in the art. For example, U.S. Pat. No. 4,111,483 (Jaeger), U.S. Pat. No. 4,111,484 (Jaeger) and U.S. Pat. No. 4,128,274 (Schmedemann) are directed primarily to the vertical positioning of a headrest relative to a patient's head. The Schmedemann patent also discloses methods for the horizontal positioning of a headrest.

Upon proper positioning, vertically and horizontally adjustable headrests can increase patient comfort with proper positioning. However, because such devices are not entirely satisfactory, headrests providing rotational movement relative to the backrest to which they are attached have been provided. Examples of such rotatively movable headrests are shown in U.S. Pat. No. 3,817,576 (Ciavattoni), U.S. Pat. No. Re. 29,811 (Norris) and U.S. Pat. No. 3,936,091 (Rabinowitz). However, the headrests described therein also have not been entirely satisfactory. The Ciavattoni device, for example, locks the headrest only in discrete positions defined by slots in the headrest which are engaged by the pawl mechanism of the device. The Norris device utilizes a cam-actuated locking mechanism having a cam surface which exerts a compressive force on a linking member to reduce the diameter of openings in which pivotable pins normally can rotate, thus preventing their rotation and the rotation of the headrest.

Pivoting and articulating headrests for different types of seats are also known in the art. Examples of such headrests are shown in U.S. Pat. No. 4,312,538 (Kennedy), U.S. Pat. No. 7,429,082 (Kraft), and in U.S. Publ. No. 2008/0290714 (Barrou). The Kennedy device is an articulating headrest for a dental chair having a unidirectional locking mechanism that prevents accidental jamming of the headrest against an object during downward movement of the dental chair. The Kennedy device, however, only provides a single pivot point along a single axis to allow positioning of the headrest between a first position and a second position. The Kraft device is a pivoting headrest for a car seat that allows swinging of the headrest from an unused position into a used position. The Barrou device is a pivoting headrest for a car seat that allows the headrest to be pivoted between a vertical position and an inclined position. These pivoting and articulating headrests provide a single pivot point and do not allow articulation of the headrest along two different axes of movement in order to provide positioning of the height and angle of the headrest.

Accordingly, it is apparent that there is a need for a simplified biarticulating headrest, for use with medical and dental chairs and the like, which can be positionally varied over various heights and angles in order to provide customized positioning of the headrest height and angle for the comfort of the patient and the healthcare provider.

BRIEF SUMMARY OF THE INVENTION

In some embodiments, the present invention includes a biarticulating headrest locking mechanism that includes a positioning assembly that is movably engaged to a first axis at a first end and to a second axis at a second end. The first end of the positioning assembly pivots about the first axis and the second end of the positioning assembly pivots about the second axis. The positioning assembly includes adjustment levers having a first end and a second end, the adjustment levers being pivotably attached to the positioning assembly. The locking mechanism includes fixed gears, wherein one of the fixed gears at least partially encloses the first axis and one of the fixed gears at least partially encloses the second axis. Each fixed gear is independently immobilized relative to axial movement around the first and second axes, respectively. At least one spring circumferentially encloses each of the first axis and the second axis. Also included are mobile gears that movably connect to the first end of each adjustment lever. One of the mobile gears at least partially encloses the first axis and one of the mobile gears encloses the second axis. Each of the mobile gears can be independently immobilized relative to axial movement around the first and second axes, each mobile gear being disposed between the fixed gear and the spring. Each of the adjustment levers can be disposed to independently pivot when force is applied to the second end thereof and move each mobile gear away and disengage from each fixed gear.

In another embodiment, the invention includes a biarticulating headrest having a chair mount adapted for attachment at one end thereof to a back support section of a chair. The headrest has a front side and a back side, and includes a base plate on the backside thereof. One or more headrest mounts can be attached to the base plate at a first end thereof. A first axis can be attached to a first end of one or more of the headrest mounts and a second axis can be attached to a second end of the one or more chair mounts. The headrest includes the previously described biarticulating headrest locking mechanism, wherein the positioning assembly is movably engaged to the first axis at a first end and is independently movably engaged to the second axis at the second end thereof.

Yet another embodiment of the invention includes a biarticulating headrest locking mechanism having: a positioning assembly means for pivotably engaging a first axis at a first end and for independently pivotably engaging a second axis at a second end; an adjustment means for disengaging the locking means, the adjustment means pivotably attached to the positioning assembly; a locking means for independently immobilizing the positioning assembly means to the first axis and for independently immobilizing the positioning assembly means to the second axis; wherein each of the adjustment means is disposed to pivot when force is applied to an end thereof and independently disengage the locking means from the first axis and disengage the locking means from the second axis.

BRIEF DESCRIPTION OF THE SEVERAL VIEWS OF THE DRAWINGS

While the specification concludes with claims particularly pointing out and distinctly claiming that which is regarded as the present invention, the advantages of this invention may be more readily ascertained from the description of the invention when read in conjunction with the accompanying drawings, in which:

DETAILED DESCRIPTION OF THE INVENTION

The illustrations presented herein are not meant to be actual views of any particular material, apparatus, system, or method, but are merely idealized representations which are employed to describe the present invention. Additionally, elements common between figures may retain the same numerical designation.

Figure 1:
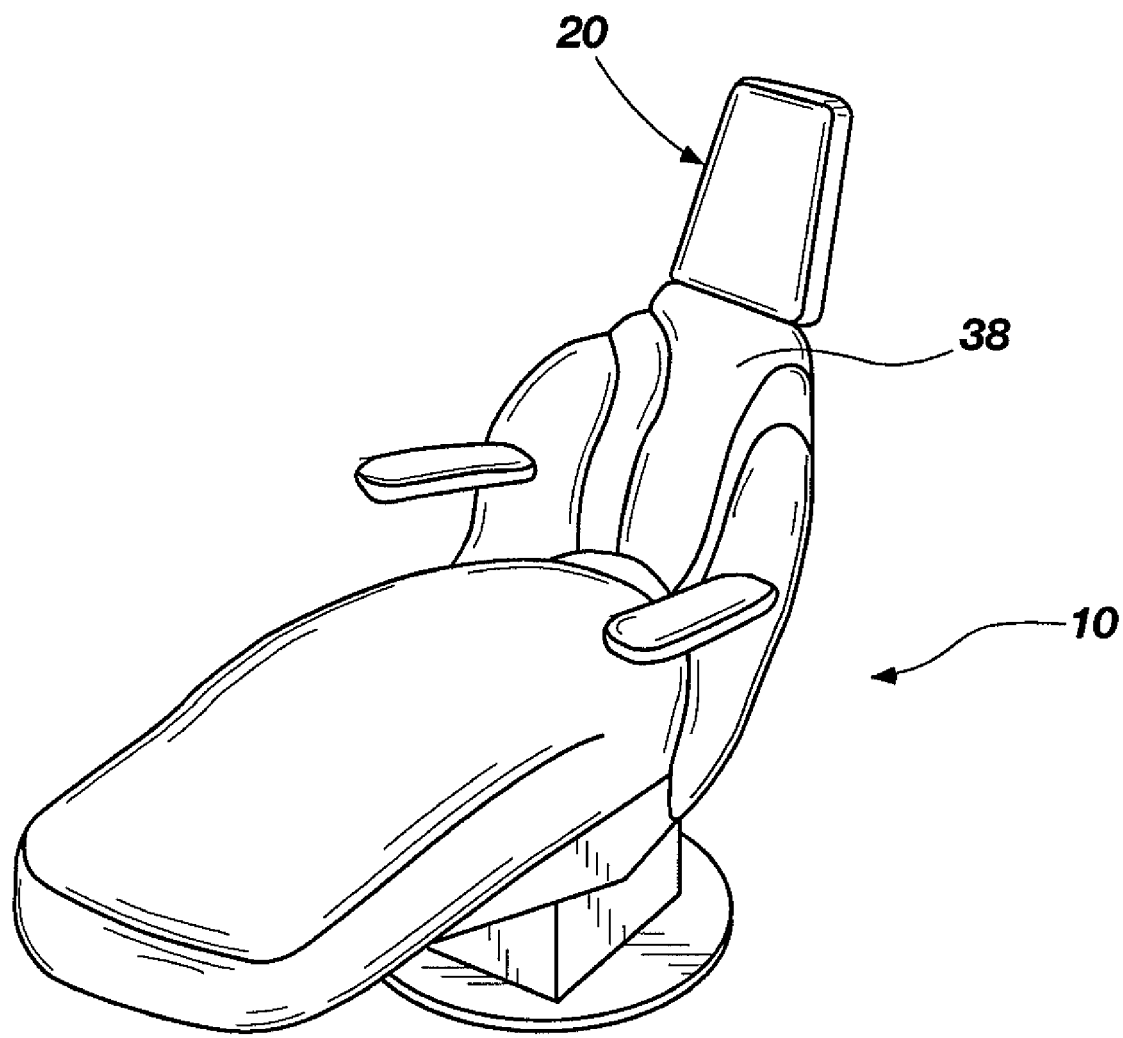
FIG. 1 is a perspective view of a headrest mounted on the backrest of a dental chair according to a particular embodiment of the invention.
Figure 2:
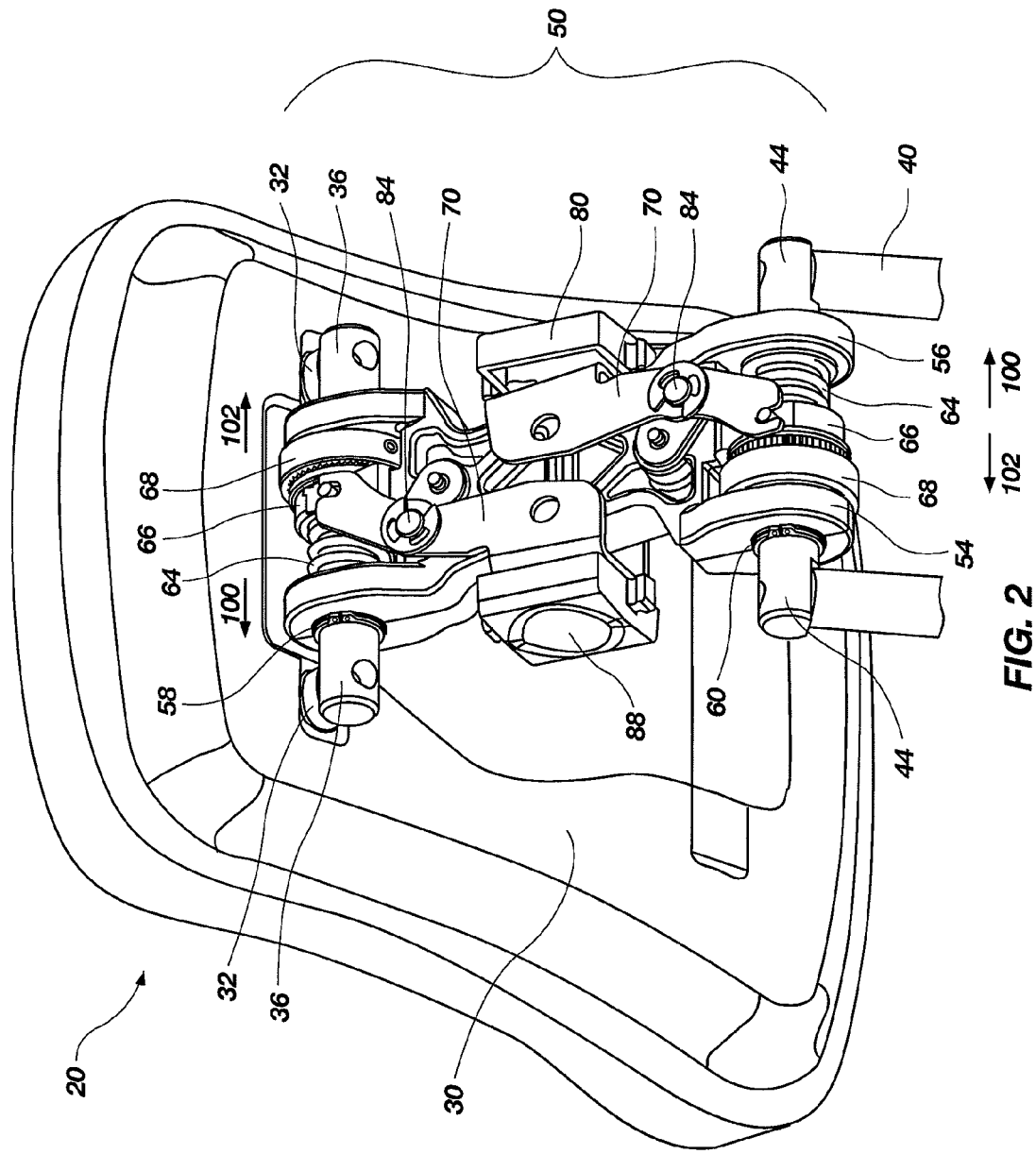
FIG. 2 is a perspective view of the headrest and positioning assembly according to an embodiment of the invention.
Figure 3:
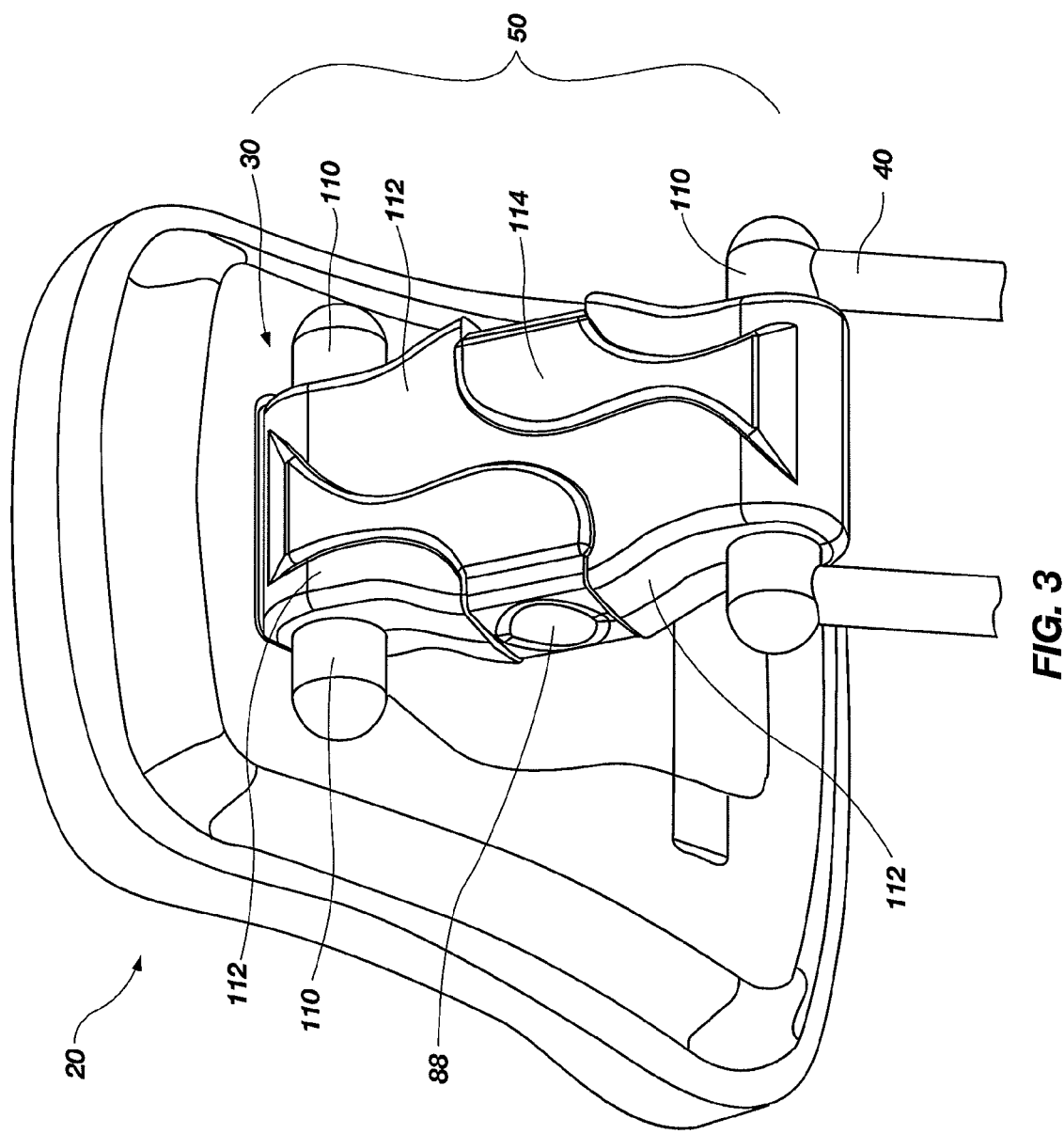
FIG. 3 is a perspective view of the headrest and covered positioning assembly according to an embodiment of the invention.

An example embodiment of a biarticulating headrest 20 of the present invention is shown in FIGS. 1 through 3. As shown in FIGS. 1 and 2, a patient chair 10 according to one embodiment of the present invention includes a headrest 20 that can be formed with a cushion on a front side and a base plate 30 on the backside. As shown in FIG. 2, a first end of one or more headrest mounts 32 can be attached to base plate 30 at a first end. First axis 36 can be attached to a second end of one or more headrest mounts 32. A first end of one or more chair mounts 40 can be attached to and extend from the back support section 38 of the patient chair 10. Second axis 44 can be attached to a second end of one or more chair mounts 40. First axis 36 and second axis 44 can be positioned in a direction that is substantially transverse to the longitudinal axis of the chair 10. It is understood that the headrest 20, headrest mounts 32, first and second axes 36, 44, and chair mounts 40 can encompass many alternative configurations and designs, and are not limited by the example illustrated herein.

Headrest positioning assembly 50 is movably engaged to first axis 36 at one end and to second axis 44 at a second end. In the illustrated embodiment, a first end of positioning assembly 50 pivots about first axis 36 and a second end of positioning assembly 50 pivots about second axis 44. Positioning assembly 50 includes left arm 54 and right arm 56, each of which has a first aperture 58 at the first end thereof and a second aperture 60 at a second end thereof. First axis 36 is received in first aperture 58 located in the first end of each of left arm 54 and right arm 56. Second axis 44 is received in second aperture 60 located in the second end of each of left arm 54 and right arm 56. Spring 64, mobile gear 66, and fixed gear 68 each circumferentially enclose first axis 36 and second axis 44. Although the illustrated embodiment shows complete circumferential enclosure of the first and second axes 36 and 44, alternative embodiments of the invention can include mobile gears 66 and fixed gears 68 configured to partially surround first axis 36 and second axis 44.

Spring 64, mobile gear 66, and fixed gear 68 are located between left arm 54 and right arm 56, with mobile gear 66 positioned between springs 64 and fixed gear 68. Fixed gears 68 are attached and immobilized on first axis 36 and second axis 44. Mobile gears 66 are adapted to move along the length of first axis 36 and second axis 44. However, mobile gears 66 can be movably attached to body 80 of the positioning assembly 50, thus preventing rotation of mobile gears 66 in an axial direction about first axis 36 and second axis 44. Mobile gear 66 and fixed gear 68 are positioned such that the tooth profiles of each face one another. The spring 64 is pretensioned to provide a force between an interior portion of arms 54 and 56, and mobile gear 66, thus forcing mobile gear 66 toward fixed gear 68 in order to prevent rotation of the positioning assembly 50 around first axis 36 and second axis 44.

Positioning assembly 50 also includes adjustment levers 70 connected to body 80 of the positioning assembly by rotation pins 84. Rotation pins 84 are received in slotted guide holes formed in adjustment levers 70. Adjustment levers 70 rotate around rotation pins 84, which form a rotation axis. Adjustment levers 70 are each movably connected to mobile gears 66 at a first end of the adjustment levers 70. Mobile gears 66 can be immobilized in the axial direction relative to first axis 36 and second axis 44 through attachments to adjustment levers 70. Attached to a second end of the adjustment levers 70 are release buttons 88. Alternatively, release buttons 88 can be integrally formed as part of adjustment levers 70. It is understood that, in particular embodiments, adjustment levers 70 and release buttons 88 can be positioned such that release buttons 88 are located on the same side of positioning assembly 50.

It is understood that positioning assembly 50 and all components therein can be made from any suitable material known in the art.

The present invention is suitable for use in installations where patient chairs are used (e.g., medical or dental chairs). Typically, the health care provider is positioned near the patient chair on a stool or chair, and operates the reclining patient chair while so positioned. During medical or dental procedures, the present invention allows positioning of the headrest to permit customized positioning of the patient's head in order to provide comfort to the health care provider and patient. The operation of the locking mechanism of the present invention will be illustrated with reference to the embodiment illustrated in FIG. 2.

In its "locked" mode, mobile gears 66 are pushed toward fixed gears 68 through the spring force that emanates from spring 64, as illustrated in FIG. 2. In this fashion, the engagement of the tooth profiles of the mobile gear 66 and fixed gear 68 are maintained. This causes the engagement of mobile gear 66 to fixed gear 68 such that both gears are immobilized, thus causing the immobilization of assembly 50 relative to first axis 36 and second axis 44.

In order to "unlock" the locking mechanism of the assembly 50, the health care practitioner pushes or depresses release button 88. This causes adjustment lever 70 to rotate around rotation pin 84 and the rotation of the adjustment lever 70 is transferred to mobile gear 66 through the rotation pin 88, thus moving mobile gear 66 (in the direction of arrow 100) against the force created by the spring 64 and away from fixed gear 68. Depression of release button 88 disengages mobile gear 66 from fixed gear 68, thus allowing free rotation of assembly 50 around first axis 36 and second axis 44, respectively and independently.

Although the engagement and disengagement of the locking mechanism has been described with reference to both first axis 36 and second axis 44 collectively for ease of discussion, it is understood that such engagement and disengagement will typically be conducted by depressing a single release button at a time in order to lock or unlock each axis 36 or 44 independently to position the headrest 20. Alternatively, engagement and disengagement of the locking mechanism can be performed by depressing both release buttons 88 simultaneously, adjusting the position of the headrest 20, and locking the headrest 20 in a desired position by disengaging both release buttons either simultaneously or independently while fine tuning the position of the headrest 20. Although the locking mechanism has been described with reference to mobile gear 66 and fixed gear 68, the locking mechanism can include any suitable locking mechanism known in the art, such as, for example, a positive locking mechanism, a cam-activated clutch mechanism, or a tooth-clutch mechanism. For example, in an alternative embodiment, the locking mechanism can include a lock gear with teeth that are adapted to engage corresponding catch slots of a fixed gear, wherein either lock gear or fixed gear are mobile in order to engagement and disengagement therebetween. In another embodiment of the invention, the locking mechanism can include a pin that engages a corresponding radial groove at a desired angle. In yet another embodiment, the locking mechanism can include a pin adapted to engage a series of holes drilled in a circular pattern that surround the axis of rotation.

After the locking mechanism has been unlocked or disengaged, the height, angle, and general position of the headrest 20 relative to the back support section 38 of the chair 10 can be selected by the healthcare practitioner. By way of example, once the particular position of the headrest 20 relative to the first axis 36 has been selected, the healthcare practitioner can disengage release button 88, which causes spring 64 to force mobile gear 66 toward fixed gear 68 (in the direction of arrow 102). This causes the engagement of mobile gear 66 to fixed gear 68 such that both gears are immobilized, thus causing the immobilization of assembly 50 relative to first axis 36 and locking the headrest 20 in a desired position. The second release button 38 can then be depressed or engaged to allow disengagement/unlocking of the release mechanism from second axis 44. Once the position of headrest 20 has been selected, the healthcare practitioner can disengage release button 88 to lock the headrest 20 in a position relative to second axis 44. This procedure can be repeated in order to fine-tune the positioning of the headrest 20 relative to the back support section 38 of the chair 10. The locking mechanism of the present invention allows independent movement of the headrest 20 along each of two rotational axes to provide fine adjustment of the headrest 20. The present invention further provides for independent or simultaneous disengagement and engagement of locking mechanisms with one finger or hand to facilitate headrest adjustment with greater ease.

With reference to FIG. 3, the positioning assembly 50 includes a base cover 112 and an adjustment arm cover 114. Base cover 112 can be either a unitary piece or various interlocking or connecting pieces. Base cover 112 can be configured to cover all moving parts and provide an ergonomic shape that provides easy access and operation of the positioning assembly 50. Adjustment arm covers 114 can be configured and disposed to overlie base cover 112. Adjustment arm covers 114 can be configured to allow movement of adjustment lever 70 and, when configured in a raised design as illustrated in FIG. 3, can provide tactile identification that guides the healthcare provider to the release buttons 88 when line of sight is obstructed. Covers 112 and 114 can be made from any suitable material known in the art, such as, for example, metal, alloys, plastic, composite materials, polymers, etc. First axis 36 and second axis 44 can be covered with axis covers 110.

Although this invention has been described with reference to patient, dental, and medical chairs, it is also applicable to other chairs, for example, automobile seats, lounge chairs, furniture, and the like where a biarticulating headrest can be utilized.

While preferred embodiments have been shown and described, those skilled in the art will recognize that changes and modifications may be made to the foregoing examples without departing from the scope and spirit of the invention. For example, specific geometries and dimensions of various elements of the described embodiments and materials used for those embodiments may be altered to suit particular applications. It is thus intended to claim all such changes and modifications as fall within the scope of the appended claims and their equivalents.

What is claimed is:

1. A biarticulating headrest locking mechanism comprising:
   a positioning assembly movably engaged to a first axis at a first end and to a second axis at a second end; wherein the first end of the positioning assembly pivots about the first axis and the second end of the positioning assembly pivots about the second axis, the positioning assembly comprising adjustment levers having a first end and a second end, the adjustment levers pivotably attached to a body of the positioning assembly;
   fixed gears, wherein one of the fixed gears at least partially encloses the first axis and one of the fixed gears at least partially encloses the second axis, wherein each fixed gear is immobilized relative to axial movement around the first axis and the second axis;
   at least one spring circumferentially enclosing the first axis and the second axis; and
   mobile gears movably connected to the first end of each of the adjustment levers, wherein one of the mobile gears at least partially encloses the first axis and one of the mobile gears at least partially encloses the second axis, wherein each mobile gear is immobilized relative to axial movement around the first axis and the second axis, each mobile gear disposed between the fixed gear and the spring;
   each of the adjustment levers disposed to pivot when force is applied to the second end thereof and to move each mobile gear away and disengage from each fixed gear.

2. The headrest of claim 1, wherein positioning assembly comprises a left arm and right arm, each arm comprising a first aperture at the first end of the left arm and the right arm, and a second aperture at a second end of the left arm and the right arm, wherein the first axis is received in the first aperture and the second axis is received in the second aperture.

3. The headrest of claim 2, wherein the springs are pretensioned to provide a force between an interior portion of the left and right arms and the mobile gears.

4. The headrest of claim 1, wherein mobile gears are movably attached to a body of the positioning assembly to prevent rotation of mobile gears in an axial direction about the first axis and second axis.

5. The headrest of claim 1, wherein mobile gears are attached to adjustment levers and immobilized in the axial direction relative to the first axis and second axis.

6. The headrest of claim 1, wherein the mobile gears and fixed gears comprise tooth profiles, wherein the tooth profiles of the mobile gears and the fixed gears are disposed face one another.

7. The headrest of claim 1, further comprising a release button attached to at least one of the adjustment levers.

8. The headrest of claim 1, wherein a release button is integrally formed as part of at least one of the adjustment levers.

9. The headrest of claim 1, wherein the second end of each of the adjustment levers is disposed on a same side of the positioning assembly.

10. The headrest of claim 1, wherein the springs, mobile gears, and fixed gears each circumferentially enclose the first axis and the second axis.

11. The headrest of claim 1, wherein the fixed gears and mobile gears comprise a positive locking mechanism.

12. The headrest of claim 1, wherein the fixed gears and mobile gears comprise a cam-activated clutch mechanism.

13. The headrest of claim 1, wherein the fixed gears and mobile gears comprise a tooth-clutch mechanism.

14. The headrest of claim 1, wherein the fixed gears comprise a lock gear with teeth and the mobile gears comprise corresponding catch slots configured to engage the teeth of the lock gear.

15. A biarticulating headrest comprising:
   a chair mount adapted for attachment at one end thereof to a back support section of a chair;

a headrest having a front side and a back side, the headrest comprising a base plate on the backside;

one or more headrest mounts attached to the base plate at a first end thereof;

a first axis attached to a second end of one or more of the headrest mounts;

a second axis attached to a second end of the one or more chair mounts;

the biarticulating headrest locking mechanism of claim 1, wherein the positioning assembly is movably engaged to the first axis at a first end and movably engaged to the second axis at the second end thereof.

16. The biarticulating headrest of claim 15, wherein the first axis and the second axis are substantially transverse to the longitudinal axis of the chair.

17. The biarticulating headrest of claim 15, wherein positioning assembly comprises a left arm and right arm, each arm comprising a first aperture at the first end of the left arm and the right arm, and a second aperture at a second end of the left arm and the right arm, wherein the first axis is received in the first aperture and the second axis is received in the second aperture.

18. The headrest of claim 1, further comprising a release button attached to at least one of the adjustment levers.

19. The headrest of claim 1, wherein the second end of each of the adjustment levers is disposed on a same side of the positioning assembly.

20. A biarticulating headrest locking mechanism comprising:

a positioning assembly means for pivotably engaging a first axis at a first end and a second axis at a second end;

fixed gears that engage a corresponding radial groove at a desired angle for independently immobilizing the positioning assembly means to the first axis and to the second axis;

adjustment means for disengaging the locking means, the adjustment means pivotably attached to the positioning assembly;

wherein each of the adjustment means is disposed to pivot when force is applied to an end thereof and independently disengage the locking means from the first axis and the second axis.

21. The headrest of claim 20, wherein the locking means comprises a pin adapted to engage a series of holes drilled in a circular pattern that surround an axis of rotation.

* * * * *